United States Patent
Chilton et al.

(10) Patent No.: US 8,375,187 B1
(45) Date of Patent: Feb. 12, 2013

(54) I/O SCHEDULING FOR FLASH DRIVES

(75) Inventors: Kendell Chilton, Southborough, MA (US); Sachin More, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

(21) Appl. No.: 11/862,417

(22) Filed: Sep. 27, 2007

(51) Int. Cl.
*G06F 13/00* (2006.01)
*G06F 13/28* (2006.01)

(52) U.S. Cl. ........ 711/167; 711/154; 711/157; 711/114; 711/E12.084

(58) Field of Classification Search .......................... None
See application file for complete search history.

(56) References Cited

U.S. PATENT DOCUMENTS

| | | | | |
|---|---|---|---|---|
| 5,432,922 A | * | 7/1995 | Polyzois et al. | 714/6 |
| 2008/0010398 A1 | * | 1/2008 | Jiang | 711/103 |

* cited by examiner

*Primary Examiner* — Kevin Verbrugge
*Assistant Examiner* — Eric S Cardwell
(74) *Attorney, Agent, or Firm* — Guerin & Rodriguez, LLP; Michael A. Rodriguez

(57) ABSTRACT

In a data storage system, a controller schedules I/Os to storage devices so that each one substantially performs only reads or only writes, thereby increasing performance. At least one storage device is designated as a current write device. The remainder of the devices are designated current read devices. Host write data is stored in a buffer memory. Storage device reads occur only from the current read devices. Storage device writes occur only to the current write device(s). In response to a triggering event, the designations are updated so that a different storage device is designated the current write device, and the remainder of the storage devices are designated the current read devices. A triggering event may include but not be limited to a time period, number of writes, cache size, device wear, environmental conditions, application requirements, or combination.

14 Claims, 19 Drawing Sheets

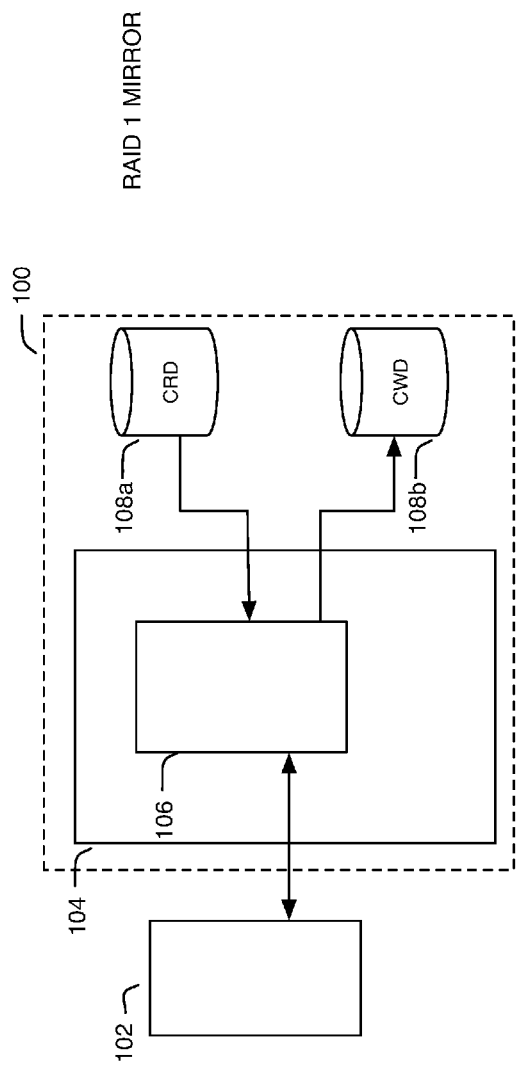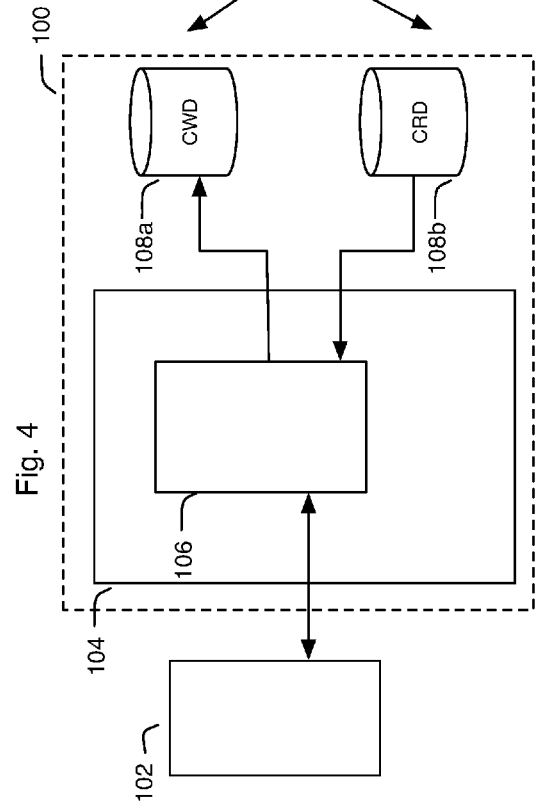

I/O SCHEDULING FOR FLASH DRIVES

FIELD OF THE INVENTION

The invention relates to data storage systems, and in particular to scheduling of data transfers to and from data storage devices in data storage systems.

BACKGROUND OF THE INVENTION

Various techniques have been developed for increasing the reliability of data storage systems and protecting against failure due to data loss. In a redundant array of independent disks (RAID) configuration, data are stored in arrays of storage devices to provide fault tolerance and improved data access performance. There are several different RAID configurations; RAID 1, RAID 5, and RAID 6 being the most widely used. In a system employing a RAID 1 architecture, storage devices are mirrored. In RAID 5 and RAID 6 architectures, user data and parity data are distributed across a group of drives. In traditional data storage systems employing hard disk drives, algorithms have been adopted to maximize data access performance in RAID arrays. These algorithms have been based on such policies as load balancing data transfers across the drives in an array, or minimizing seek times, because these are the factors that most affect spinning plate track/sector based disk drive performance.

SUMMARY OF THE INVENTION

Newer data storage systems employ solid state storage devices. In accordance with the invention, it has been discovered that read/write performance dynamics differ significantly between spinning plate track/sector based disk drives and solid state write anywhere data storage devices. This discovery leads to a novel way of scheduling data transfers between a buffer memory and storage devices in a data storage system.

In a data storage system employing a mirrored pair of storage devices (i.e. RAID 1), one of the storage devices in the mirrored pair is designated as the current write device. The other storage device in the mirrored pair is designated as the current read device. Host writes are stored in a buffer memory. Storage device reads are allowed to occur only from the current read device to the buffer memory. Storage device writes are allowed to occur from the buffer memory only to the current write device. Upon the occurrence of a triggering event, a swap operation is performed so that the current write device becomes the current read device and the current read device becomes the current write device.

Swaps occur in response to triggering events. A triggering event may include but not be limited to a certain time period; a certain number of writes; cache size; device wear; environmental conditions; application specific requirements; on demand from an operator; based on policies set for logical volumes to meet availability objectives; based on reactive or predictive algorithmic attempts to optimize performance, or any combination thereof.

When embodied in a data storage system employing solid state storage devices, the invention keeps each solid state storage device very close to performing only reads or only writes, thereby increasing the performance of the system.

When applied generally to all data storage system embodiments, for example RAID 5, RAID 6, etc., at least one of a plurality of storage devices is designated as a current write device. The remainder of the plurality of storage devices as designated current read device(s). Host write data is stored in a buffer memory. Storage device reads occur only from the current read device(s). Storage device writes occur only to the current write device(s). In response to a triggering event, the designations are updated so that a different at least one of the plurality of storage devices is designated the current write device, and the remainder of the plurality of storage devices are designated the current read device(s). The triggering event can be any of the triggering events previously mentioned. In accordance with a further aspect of the invention, some current write devices may have read capability.

When embodied in system employing solid state storage devices, the invention keeps each solid state storage device substantially performing only reads or only writes, thereby increasing the performance of the system.

BRIEF DESCRIPTION OF THE DRAWINGS

FIG. 4 is a schematic diagram of a data storage system wherein the data storage devices employ a RAID 1, or mirrored, architecture.

FIG. 7 is a schematic diagram of the data storage system of FIG. 4 showing the designations of the storage devices after a swap has occurred in accordance with the invention.

DETAILED DESCRIPTION OF EXEMPLARY EMBODIMENTS

Figure 1:
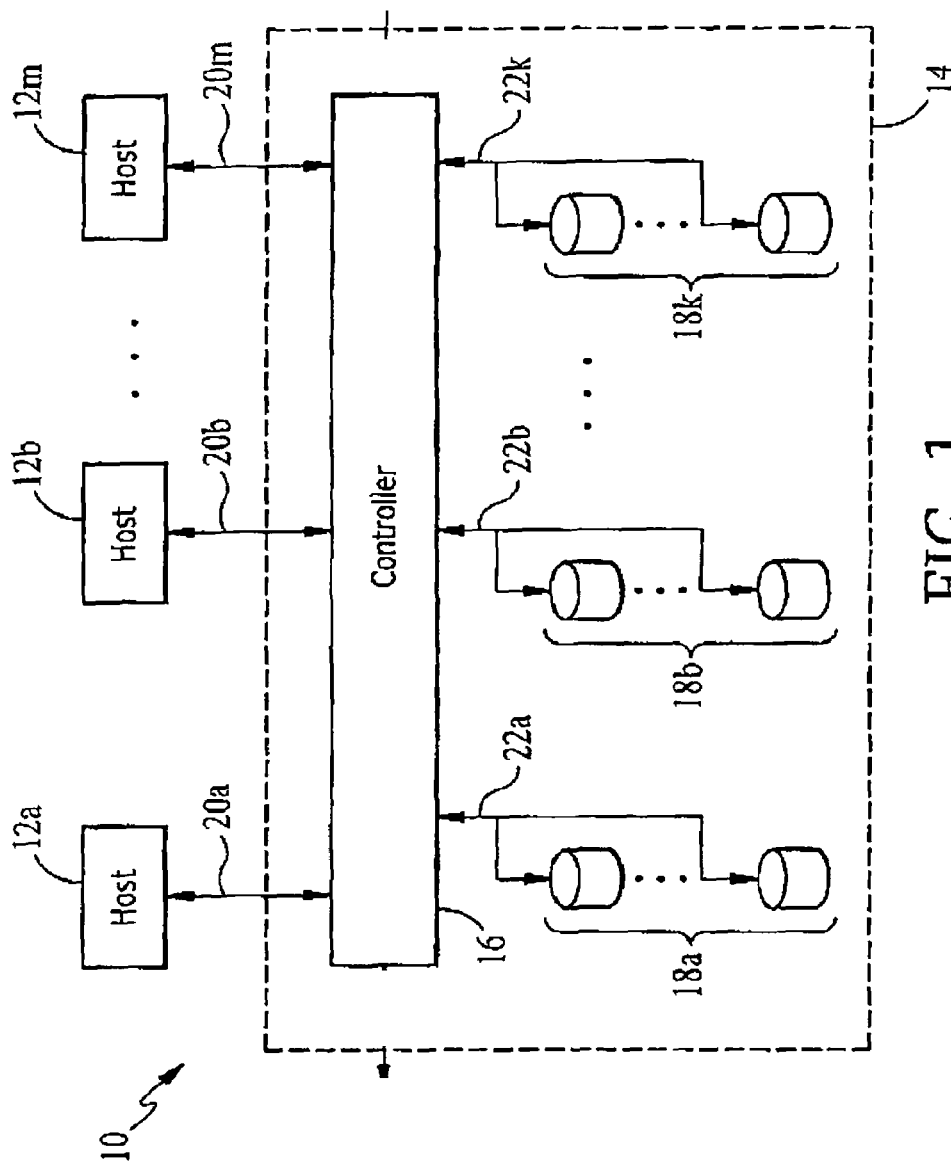
FIG. 1 is a schematic diagram of a data storage system in which the invention can be employed.

Referring to FIG. 1, a data processing system 10 includes host computers 12, 12b, . . . 12m, connected to a data storage system 14. The data storage system 14 receives data and commands from, and delivers data and responses to, the host computers 12. The data storage system 14 is a mass storage system having a controller 16 coupled to pluralities of physical storage devices shown herein as disk devices 18a, disk devices 18b, . . . , disk devices 18k. The controller 16 interconnects the host computers 12 and the disk devices 18. The controller can be, for example, a controller of the Symmetrix data storage system from EMC Corporation. Although described herein as a component of a data storage system, the controller 16 could also be a separate appliance or server. The controller 16 thus receives write commands from the various host computers over buses 20a, 20b, . . . ,20m, respectively, for example, connected and operated in accordance with a Fibre Channel (FC) protocol (or any other suitable protocol like SATA, SAS, Infiniband etc.), and delivers the data associated with those commands to the appropriate devices 18a, 18b, . . . 18k, over respective connecting buses 22a,22b, . . . , 22k. Buses 22 also operate in accordance with the protocols under which the respective devices 18a, 18b . . . 18k operate. The controller 16 also receives read requests from the host computers 12 over buses 20, and delivers requested data to the host computer 12, either from a cache memory of the controller 16, or, if the data is not available in cache memory, from the disk devices 18.

Figure 2:
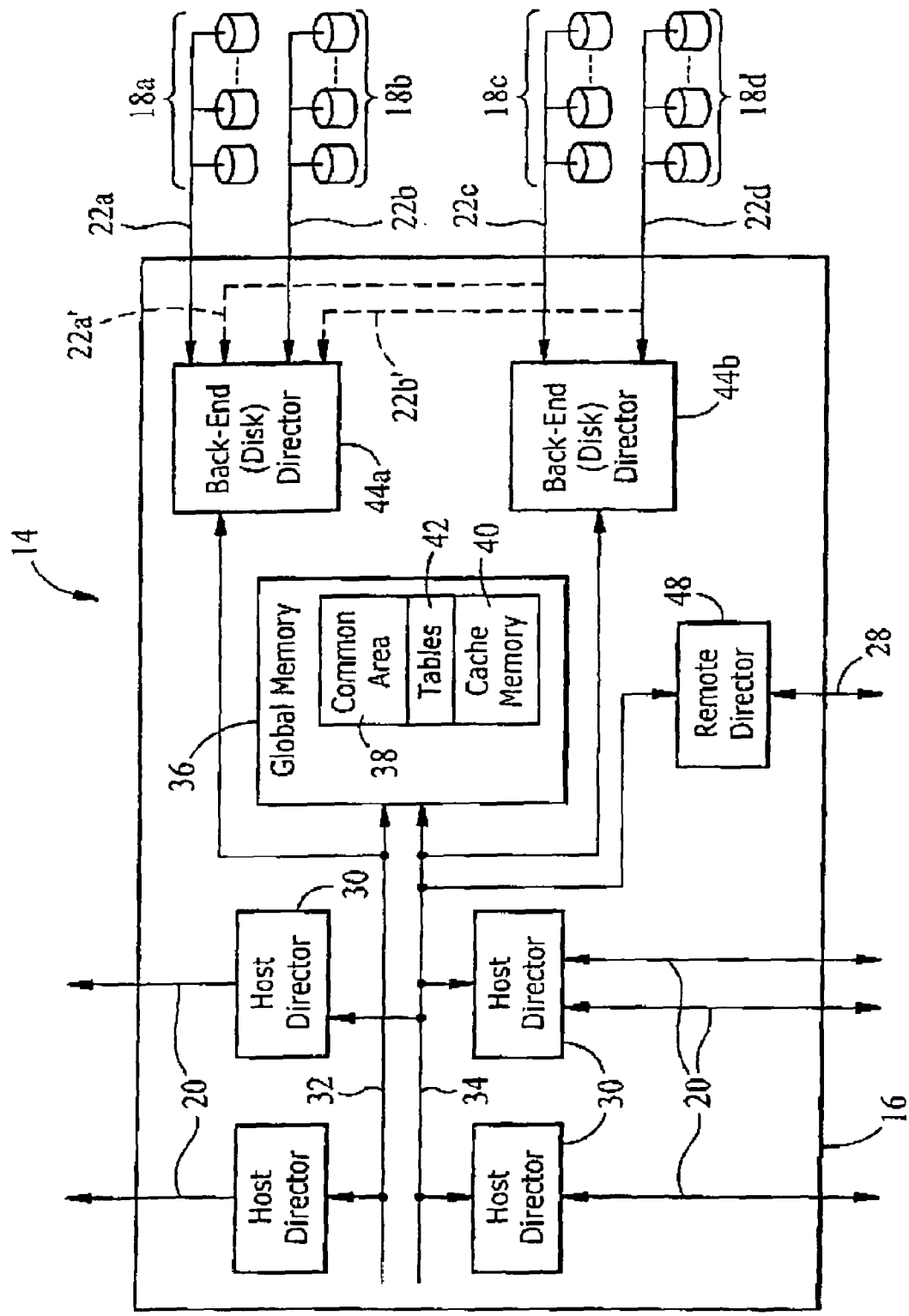
FIG. 2 is a schematic diagram of the data storage system of FIG. 1 wherein the controller 14 is shown in more detail.
Figure 3:
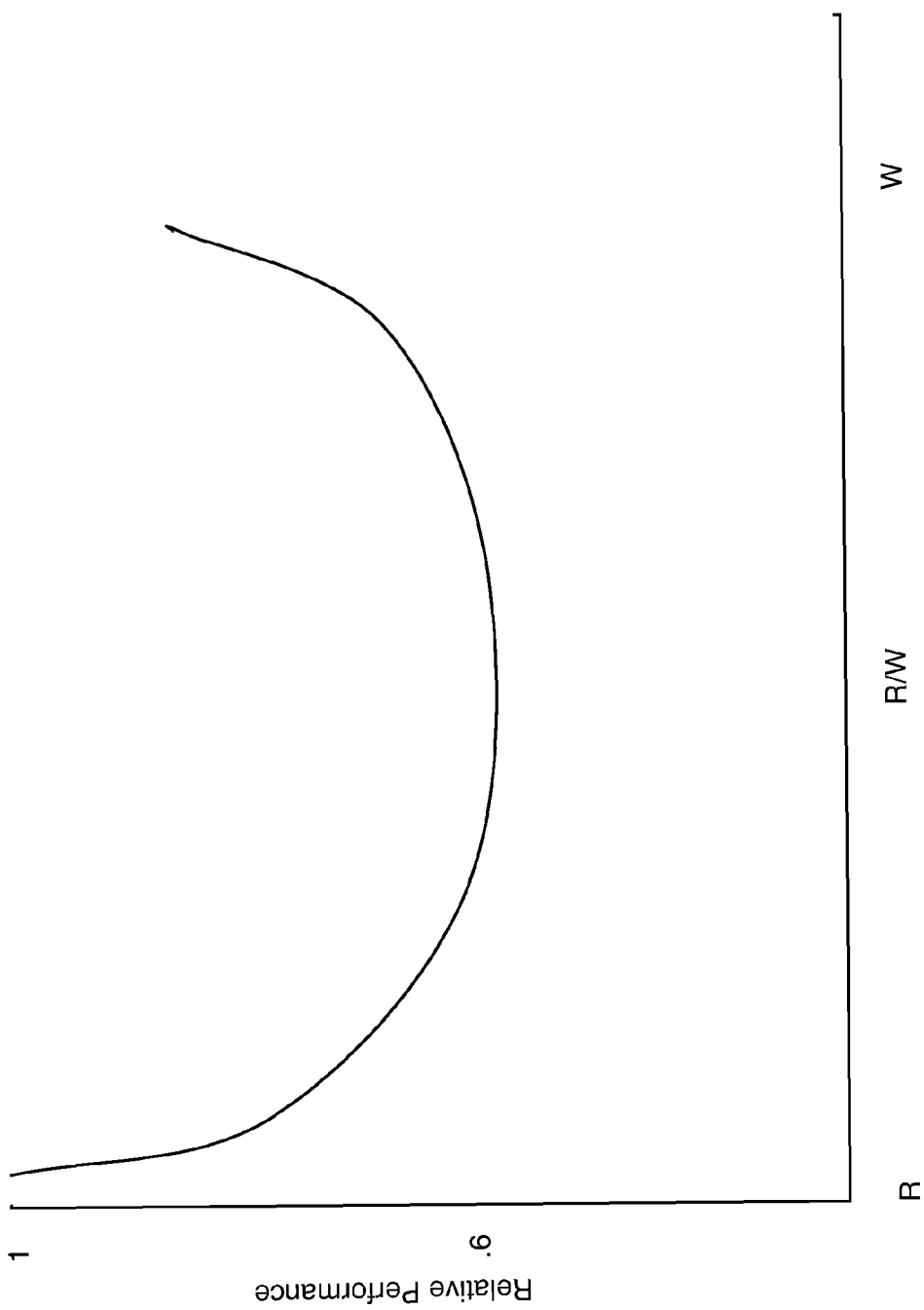
FIG. 3 is a plot of relative read/write performance for solid state memory devices. The devices perform best when doing 100% reads or 100% writes. The devices perform worst when doing 50% reads, 50% writes.

Referring to FIG. 2, and using the EMC Symmetrix controller as an illustrative example, details of the internal architecture of the data storage system 14 are shown. Host computers are connected to host directors 30 using communication lines 20. Each host director, in turn, connects over one or more than one interconnection paths 32 or 34 to a global memory 36. The global memory 36 is a large memory through which the host director 30 can communicate with back-end disk directors 44. The global memory includes (among other things) a common area 38 for storing metadata for the data stored on the disk devices 18, a cache memory 40 for storing recently accessed data from disk devices 18.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system. Each disk director 44 controls a plurality of disks 18. The connections are architected in such a way that if a disk director 44 fails, disks 18 under its control are taken over by another disk director 44.

Like the host directors 30, the disk directors 44 are also connected to the global memory 36 via one or more interconnection paths 32, 34. A write operation is conducted in two phases: The host director 30 receives the data from the host 12 and stores it in the global memory 36 and indicates to the host 12 that the write operation is done. During the second phase, which happens later decided by availability of system resources, the disk directors 44 read data stored in the global memory 36 by the host director 30 and write that data (and associated parity information, if any) to the disk devices 18 for which they are responsible. During a read operation, the disk directors 44 read data from a disk device 18 and write that data to global memory 36 which is returned by the host director 30 to the requesting host computer 12. It should be noted that reading data from disk device 18 is a synchronous operation that is carried out as soon as possible after the host 12 issues the requests while writing to the disk device 18 is carried out asynchronously, at the convenience of the system.

Many data protection schemes have been implemented in data storage systems such as the Symmetrix system shown herein, from fully redundant data protection schemes (e.g. mirroring, a.k.a. RAID 1) to fault tolerant schemes using parity protection such as RAID 4, 5, and 6, and combinations thereof. In systems wherein the storage devices 18 are hard disk drives, algorithms have been developed to optimize the performance of read and write operations for some of these schemes, based on the performance characteristics of the drives.

Consider for example the system of FIG. 2 wherein mirroring is employed. In this case, same data resides on two different disk devices 30, each connected to a different disk director 44. When data is written, both disk directors 44 access the global memory 36 and write the data to the disk device 30 under its control. On the other hand, when data are read, only one disk director needs to read it from the disk device under its control. The choice of the device to read from in response to a given read command, at a given time affects system performance. In systems wherein the storage devices are hard disk drives, methods have been developed for optimizing read write performance. Depending on the nature and variety of read and write operations to a physical drive containing many logical volumes, the disk read/write heads may be severely worked so that the access time may, on average, be increased if sequential read and write locations are not located near one another.

Newer storage systems employ solid state storage devices (e.g. "flash" memory) instead of (or as well as) hard drive storage devices. In accordance with the invention, it has been discovered that solid state storage devices have different read write performance characteristics than spinning hard drive storage devices Performance depends largely on head seek time and rotational latency rather than the operation itself; thus, read and write times do not vary greatly from each other. Solid state storage devices, on the other hand, are internally "write anywhere" devices. As such, when a write is issued, data may be stored on any available space in the solid state device (as opposed to the exact track/block on a rotating disk drive). Earlier location of the data is reclaimed later and added to the pool of available space. A read operation on the other hand needs to access the exact location where data are stored.

In accordance with the invention it has been discovered that in the write anywhere solid state device, where new writes and reads are both occurring to random locations, the probability of writes blocking reads is higher than such probability in a spinning disk drive. Furthermore, when a write blocks a read in a solid state device, the read is disproportionately delayed because solid state writes are slower than solid state reads. Further in accordance with the invention it has been discovered that, when I/O's to a static storage device consist of 100% writes, performance is very good. Similarly, when I/O's to a static storage device consist of 100% reads, performance is also very good. However, when I/O's to a static storage device consist of a mixture of reads and writes, I/O performance dips sharply. For these reasons, algorithms that have been designed to optimize storage system I/O performance in redundant and fault tolerant storage system architectures employing hard drives do not provide optimal performance in a similar system employing solid state devices.

The invention therefore provides new solutions for optimizing I/O performance in storage systems employing solid state devices. In particular, it has been discovered in accordance with the invention that solid state storage devices perform best when executing either approximately 100% reads or 100% writes. Thus, an I/O scheduling policy in accordance with the invention attempts to direct either a very high percentage of reads OR writes to a particular solid state device in order to maximize performance. For clarity of description, the scheduling policy is first presented as it is embodied in a storage system employing mirroring (RAID 1), and then as it is embodied in storage system employing a RAID 5 array, and then a RAID 6 array. The invention is then described as it applies generally to many different storage system embodiments.

RAID 1

Referring to FIG. 4, there is shown a simplified storage system 100 implementing RAID 1 mirroring. A host 102 is coupled to a controller 104 including a buffer memory, e.g. cache 106. Solid state devices 108a and 108b are coupled to the controller 104. The solid state devices 108a, 108b in this case are arranged as a mirrored pair; they thus appear to the host 102 as one logical storage device.

In a Symmetrix type data storage system such as that of FIG. 2, host directors would be present in the data path between the host and cache 106, and back end directors would be present in the data path between the cache 106 and solid state devices 108a,b. These directors are not shown in FIG. 4 for clarity of description of the invention, and one skilled in the art will understand how to incorporate them into the respective datapaths.

As previously described, in presently known mirrored systems, data is written to both devices of a mirrored pair, and read from either one. However, in accordance with the invention, in a data storage system employing solid state devices as a mirrored pair, data is written to only one device of the mirrored pair at a given point of time while reading from the other, until a trigger event causes the devices to be swapped. Thus each device performs close to 100% reads or writes. Note that the above scheme is possible only in Symmetrix like systems which hold data to be written in a cache or buffer memory.

Figure 5:
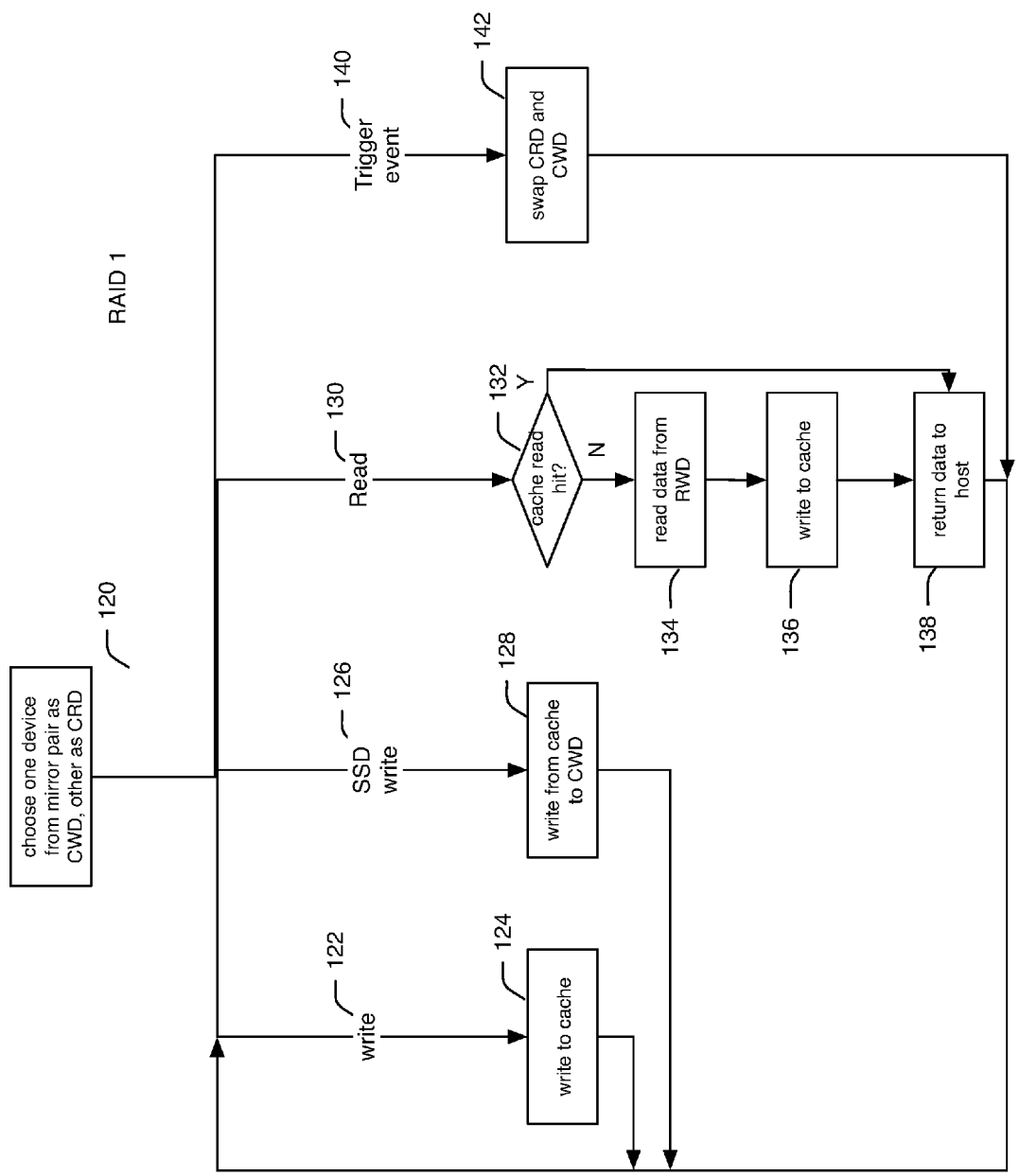
FIG. 5 is a flow diagram of the operation of the controller 104 of FIG. 4 in accordance with the invention.

The operation of the controller 104 is shown in FIG. 5. Initially, one of the solid state devices (108b, FIG. 4) is designated as the current write device ("CWD"), and the other as the current read device ("CRD")(step 120). This may be done randomly or in accordance with a scheme that chooses the lowest bus address, or any such means. When the controller 104 receives a write request from the host 102 (branch 122), the data is written to the cache 106 (step 124). When it comes time to post writes to the solid state storage devices (SSD) from the cache (e.g. due to cache policy) (branch 126), the writes are posted to only one of the solid state devices of the mirrored pair, the solid state device currently designated the CWD (step 128), in this case solid state device 108b. When the controller 104 receives a read request from the host 102 (branch 130), the data is read from the cache 106 if present (step 132). If not present, the data is read from only one of the solid state devices (step 134), the one currently designated the CRD) (in this case solid state device 108a), and returned to the cache (step 136) and host (step 138).

After a triggering event (branch 140), a policy decision causes a swap of the designated devices (step 142). The storage device designations are swapped so that the old read device becomes the CWD) and the old write device becomes the CRD.

FIG. 7 shows the storage system of FIG. 4 after a swap. Solid state storage device 108a is now the CWD, while solid state storage device 108b is now the CRD.

Figure 6:
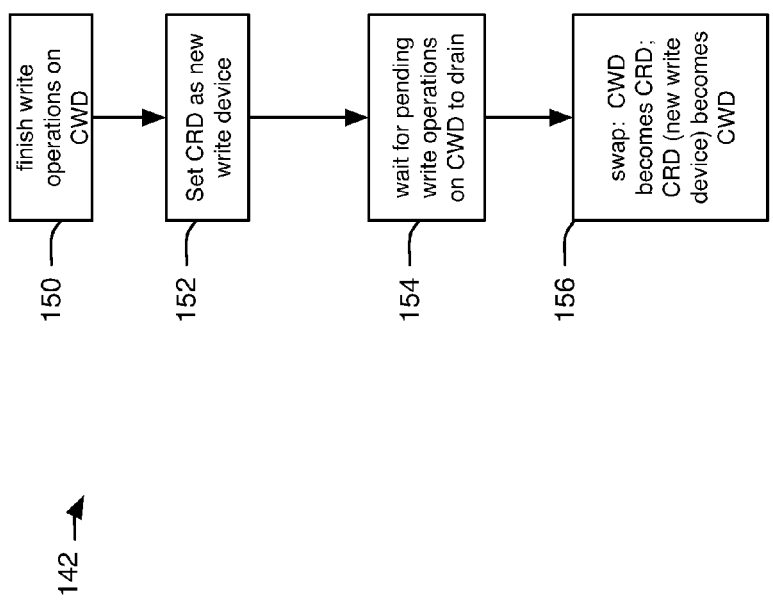
FIG. 6 is a flow diagram of the operation of the swap logic 142 of FIG. 5 in accordance with the invention.

In particular, referring to FIG. 6, step 142 of FIG. 5 is set forth in further detail. When swapping the devices, the write operations currently pending on CWD are allowed to finish (step 150). During this time, read operations can be done from either device (step 152). After the write operations are drained in the CWD, only then it becomes CRD and CRD becomes CWD (step 156). After the swap is over, the new CWD starts writing the data that the other former CWD (now the CRD) device wrote before the swap occurred and any other data that is newly written from the host.

During the time that the solid state devices are being swapped, it is important that reads be allowed to complete properly. For this reason, the swap includes a state where both solid state devices enter a read state. (FIG. 6 step 152.) During this time, reads can occur to either the CRD or the CWD until writes are drained in the CWD and rules that prefer the CRD over the CWD for these reads can take into account the overhead of the pending writes on the CWD versus the latency cost of the queuing on the CRD. Then the CRD is designated the CWD, the CWD is designated the CRD, and reads and writes directed to their designated devices until the next swap. Also during the time of the swap, new write data from the hosts is stored in the global memory until the swap completes. For this reason, the global memory is preferably non-volatile and fault-tolerant, but systems which simply buffer these writes in unprotected memory are within the scope of this invention.

Swaps occur in response to triggering events. A triggering event may include but not be limited to:

1) a certain time period; for instance, read and write devices may be swapped every few milliseconds;

2) a certain number of writes; for instance, read and write devices may be swapped after a certain number of writes are performed to the write device or to the cache;

3) cache size; for instance, read and write devices may be swapped in accordance with the size of the cache and how many transactions it is able to hold between swaps;

4) device wear; for instance, read and write devices may be swapped in accordance with the level of wear on one device as opposed to the other;

5) environmental conditions;

6) application specific requirements;

7) on demand from an operator;

8) policies set for the logical volume to meet availability objectives;

9) reactive or predictive algorithmic attempts to optimize performance;

10) any combination of the above.

Triggering events need not occur at even intervals in time. They may occur for example every t milliseconds unless the level of writes in the cache exceeds a certain threshold or the number of writes outstanding to the CWD exceeds a certain threshold. Triggering events may be manual or automatic, software or hardware based, embedded, application aware, or exposed via API or other interface, and may change over time. One skilled in the art will understand the many system dependent conditions and requirements upon which triggering events may be based and presented.

RAID 5

Traditional storage systems employing hard disk drives commonly utilize a fault tolerant form of RAID employing parity, most commonly RAID 5. RAID 5 systems employ parity as protection against data loss. Typically, "N+1" storage units in a set are divided into "stripes". Each stripe has N blocks of data, plus one parity block on one storage unit containing parity for the remainder of the stripe. Subsequent stripes use a different device to store the parity block. For example, in a RAID 5 system comprising 4 disk drives, the parity information for the first stripe of blocks may be written to the fourth drive; the parity information for the second stripe of blocks may be written to the third drive, the parity information for the third stripe of blocks may be written to the second drive, etc.

In order to change a data block on a RAID 5 system, a Read-Modify-Write sequence comprising two read and two write operations is required. First the old parity and the old data block must be read and XOR'd (to "remove" the information content of the old data from the parity), and the resulting sum must then be XOR'd with the new data (to provide new parity information). Then both the new data and the parity block must be written to the drives. When one disk fails in a RAID 5 N+1 system, the read data can be rebuilt by reading the data from the blocks on the remaining N drives and XOR'ing the data.

In traditional storage systems where the storage devices consist of hard disk drives, it has been considered advantageous to try to balance read write activity across the disk drives of the RAID system. However, in accordance with the invention, in a storage system where the storage devices consist of solid state devices, writes to certain designated devices in a RAID array will be held off in accordance with an I/O scheduling policy so as not to interfere with reads to the devices, in order that read activity not be blocked by write activity.

Referring to FIG. 8, there is again shown a simplified storage system 200. A host 202 is coupled to a controller 204 including a buffer memory or cache 206. Four solid state devices 208*a*, 208*b*, 208*c*, 208*d* are coupled to the controller 204. The solid state devices 208 in this case are arranged as a RAID 5 3+1 redundancy group.

Again, in a Symmetrix type data storage system such as that of FIG. 2, host directors would be present in the data path between the host and cache 206, and back end directors would be present in the path between the cache 206 and solid state devices 208. These directors are not shown in FIG. 8 for clarity of description of the invention, and one skilled in the art will understand how to incorporate them into the datapaths.

Figure 9:
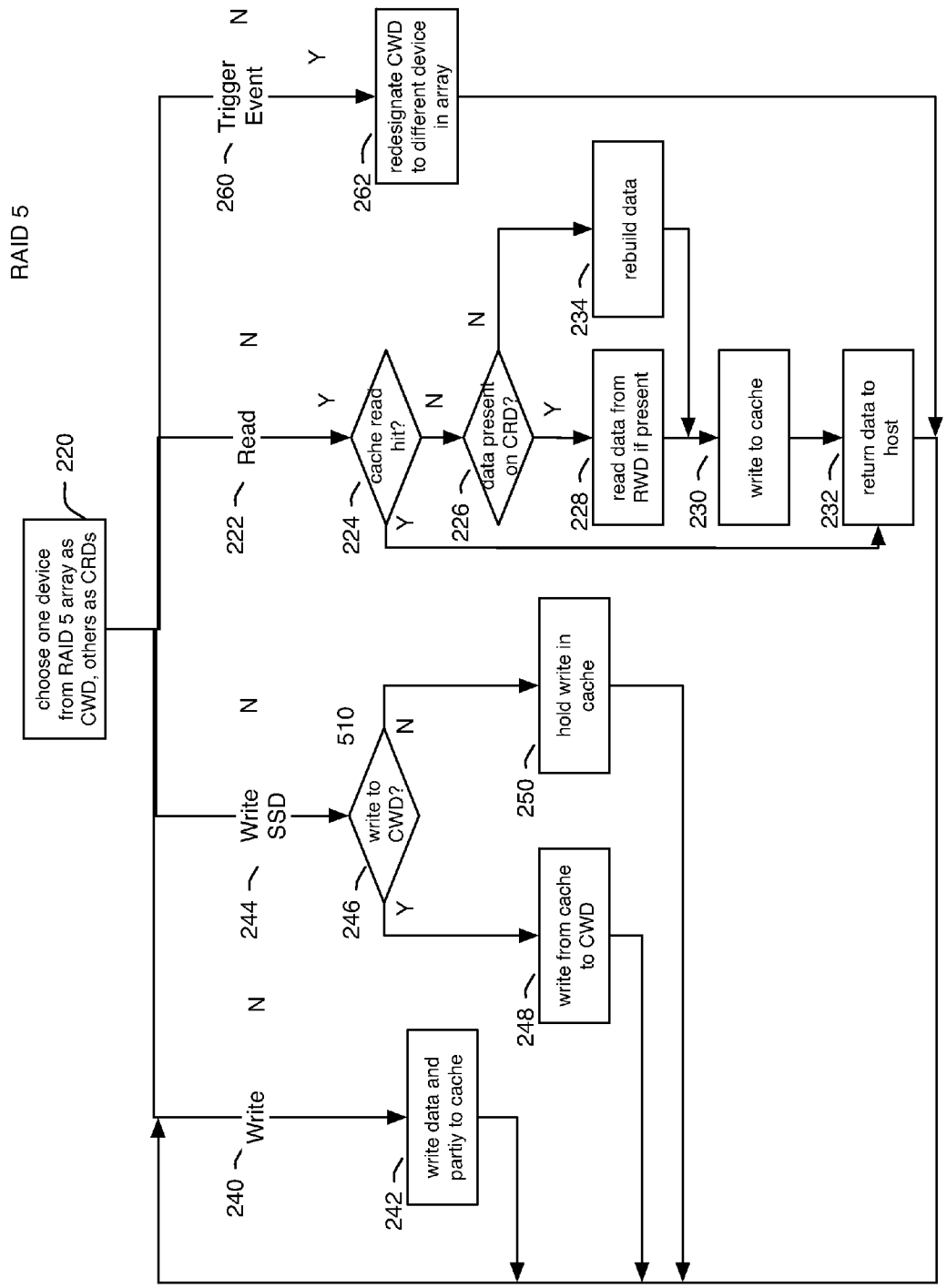
FIG. 9 is a flow diagram of the operation of the controller 204 of FIG. 8 in accordance with the invention.

In accordance with one embodiment of the invention, as shown in FIG. 9, the controller 204 initially designates one solid state storage device as a current write device (CWD). The other three devices are designated as current read devices (CRD) (step 220). When the host 202 performs a read (branch 222), the data is read from the cache 206 if present (step 224). If not present, the data may be read from any of the solid state devices currently designated as read devices (CRDs) if in fact it happens to reside there (steps 226, 228.) It is then written to the cache (step 230) and returned to the host (step 232).

If some or all of the data to be read is not in the cache and resides on the CWD (step 226), then the data is "rebuilt" just as if it resides on a broken RAID disk (step 234). In order to do so, three reads are performed—one to each other solid state device on which data resides—and then an XOR operation is performed by the controller 204 to rebuild the data.

As previously explained, every write in a RAID 5 array actually consists of two write operations—one for data, and one for parity. When a host write is received by the controller (branch 240), the controller performs the read—modify portion if required (performing the read portion as described above, steps 222-234), and then caches both the data write and the parity write (step 242). As writes to the solid state devices come up (step 244), data writes or parity writes directed to the CWD will be posted and performed as usual (steps 246, 248). If data writes or parity writes are directed to a CRD, they are held in the cache (steps 246, 250). It should be noted that in the event of an actual disk failure, the cache memory either holds the copy of the data yet to be written, or the parity of the data stripe yet to be written, so fault tolerance is maintained since the data in memory plus that contained in the remaining drives retain sufficient information to reconstruct all the data lost in the failed drive.

Figure 8:
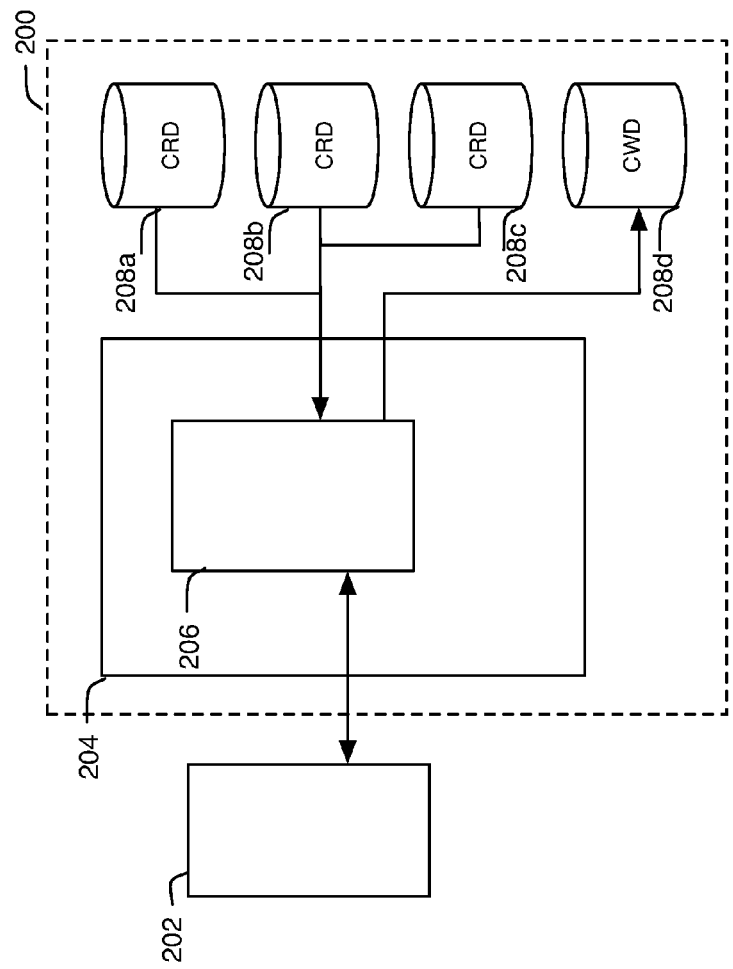
FIG. 8 is a schematic diagram of a data storage system wherein the data storage devices employ a RAID 5 3+1 fault tolerant architecture.
Figure 10:
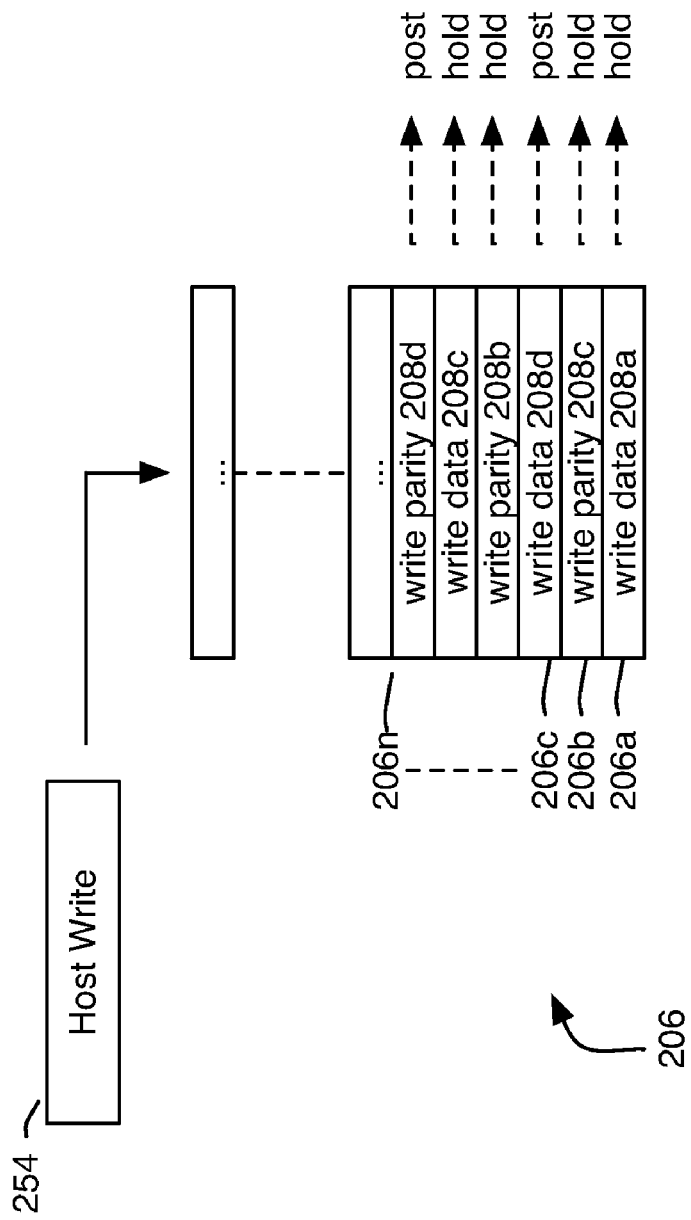
FIG. 10 is an example of the operation of cache 206 of FIG. 8 in accordance with the invention.

An example of cache 206 entries and their subsequent I/O scheduling for the system of FIG. 8 is shown in FIG. 10. A host write transaction 254 is converted by the controller 204 into storage device data and parity writes that are stored in cache 206 entries 206*a-n*. In this example, the storage device 208*d* of FIG. 8 is the CWD. The first cache entry is to device 208*a*, a CRD, so it is held in the cache. The second is a parity write to device 208*c*, a CRD, so it is also held. The third is a data write to 208*d*, the CWD, so it is posted. The fourth write is a parity write to 208*b*, a CRD, so it is held. The fifth write is a data write to a 208*c*, a CRD, so it is held. The sixth write is a parity write to the CWD so it is posted.

Referring back to FIG. 9, occurrence of a triggering event (branch 260) causes a different one of the solid state devices 208 to become the designated CWD (step 262), while the CWD is re-designated a CRD. During this re-designation, the writes pending on the CWD are allowed to drain and reads are allowed from all devices. Then the storage device designations are updated so that the previously designated CWD becomes a read device (CRD) and the newly designated CWD becomes the write device. In a RAID 3+1 system, the CWD device can be rotated through each of the four drives in accordance with the scheduling policy, or can be selectively applied to a subset of the devices, in accordance with system requirements.

Figure 11:
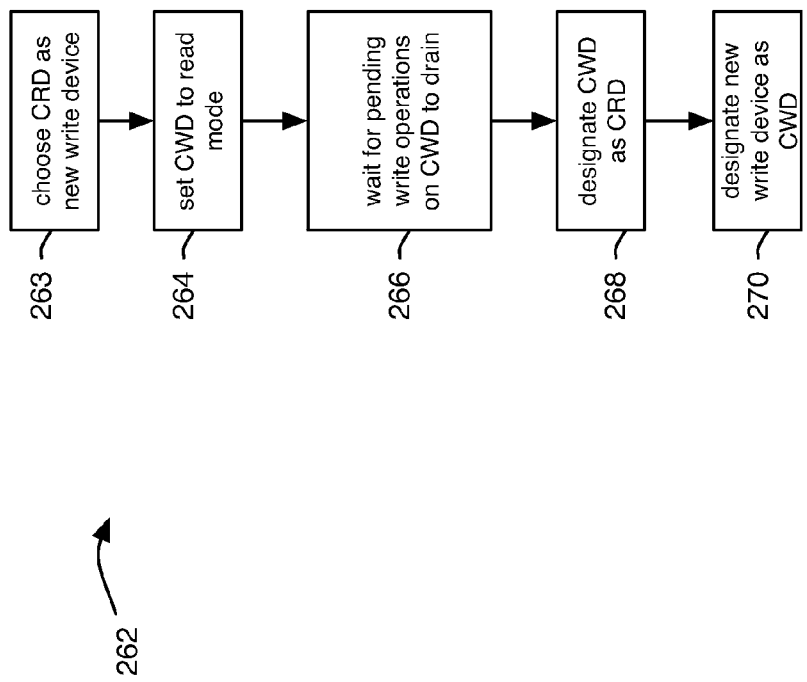
FIG. 11 is a flow diagram of the operation of the re-designation logic 262 of FIG. 9 in accordance with the invention.

In particular, referring to FIG. 11, in order to perform the re-designation of step 262, one of the current read devices is designated by the controller as the new write device (step 263). The controller then sets the CWD to read mode (step 264) and waits for the pending write operations on the CWD to drain (step 266). Once the writes are complete, the controller designates the current write device as a current read device (step 268) and designates the new write device as the current write device (step 270).

During the time that the solid state devices are being re-designated, it is important that reads be allowed to complete properly. For this reason the swap includes a state where all solid state devices enter a read state. During this time, reads can occur to all devices until all write operations are drained from CWD (step 264). Then the new write device is designated the CWD, the CWD is designated a CRD, and reads and writes directed to their designated devices until the next trigger event.

Figure 12:
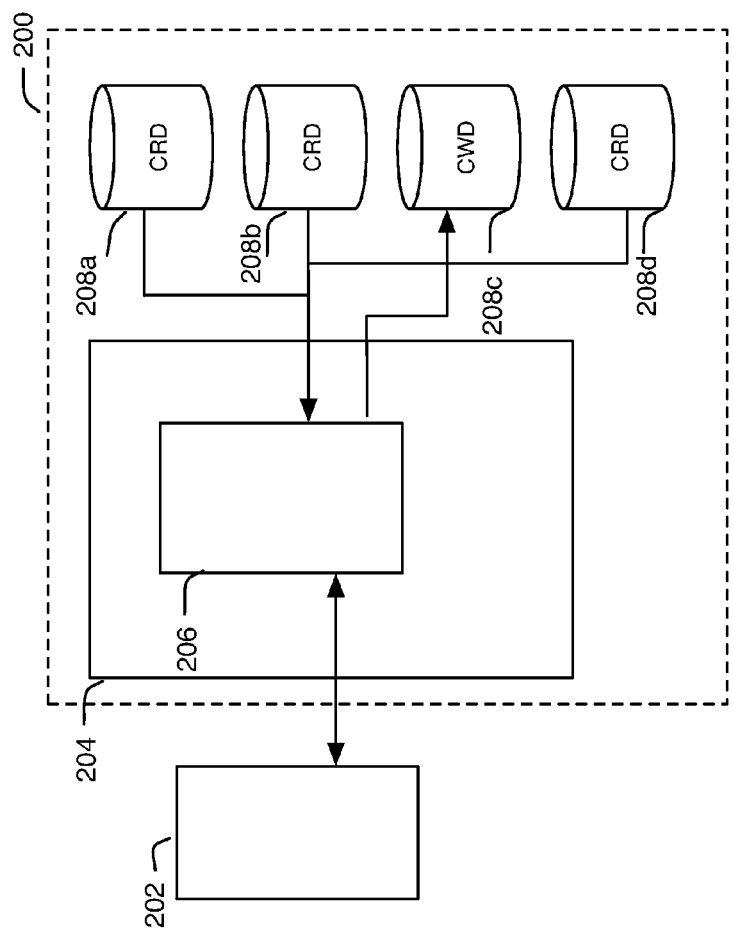
FIG. 12 is a schematic diagram of the data storage system of FIG. 8 showing the storage devices after they have been re-designated in accordance with the invention.

The triggering events that prompt device re-designation in a RAID 5 system are the same as those previously described for the mirrored array. FIG. 12 shows the system of FIG. 8 after the CWD has been re-designated. In FIG. 8, solid state device 208*d* was the CWD, while solid state devices 208*a, b*, and *c* were CRDs. After a triggering event, solid state device 208*c* is the CWD, while solid state devices 208*a, b*, and *d* are CRDs.

RAID 6

The invention is also advantageously employed in RAID 6 systems. RAID 6 is essentially an extension of RAID 5 that allows for additional fault tolerance by using a second independent distributed parity scheme (dual parity). Data is striped on a block level across a set of drives, as in RAID 5, and a second set of parity is calculated and written across all the drives. RAID 6 provides for higher data fault tolerance in that it can sustain multiple simultaneous drive failures. The invention in the RAID 6 case operates in the same manner as described for the RAID 5 case above, although more than one solid state storage devices can be designated as write only devices, up to the maximum number of drives that can be recovered using the rebuild algorithm.

Figure 13:
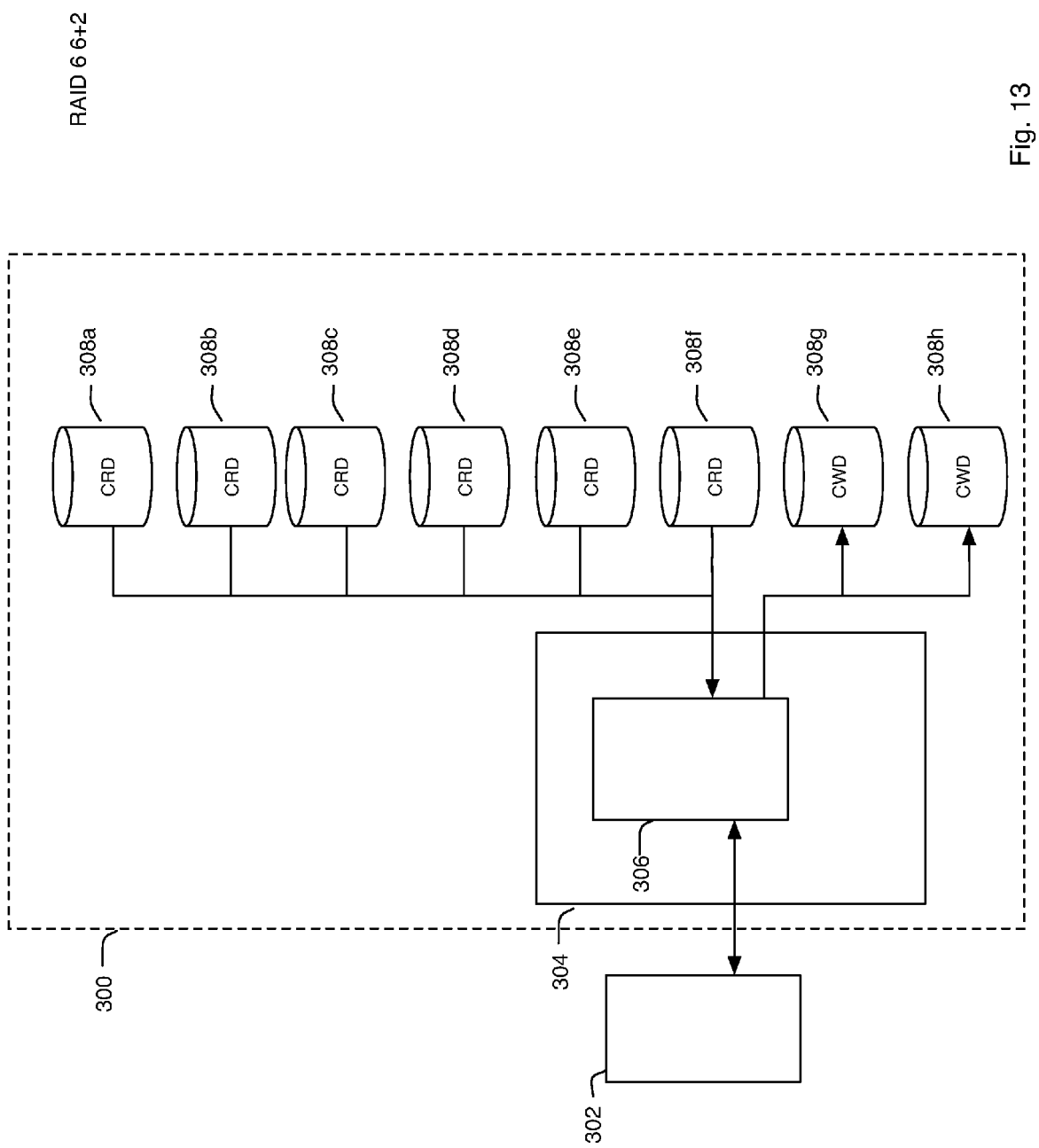
FIG. 13 is a schematic diagram of a data storage system wherein the data storage devices employ a RAID 6 6+2 fault tolerant architecture.

For example, as shown in FIG. 13, a data storage system 300 in accordance with a RAID 6 embodiment of the invention includes a host 302 coupled to a controller 304 including a cache 306. Eight solid state devices 308a,b,c . . . h are coupled to the controller 304. The solid state devices 308 in this case are arranged as a RAID 6 6+2 redundancy group, so that 2 disks can fail in the group without losing data.

Figure 14:
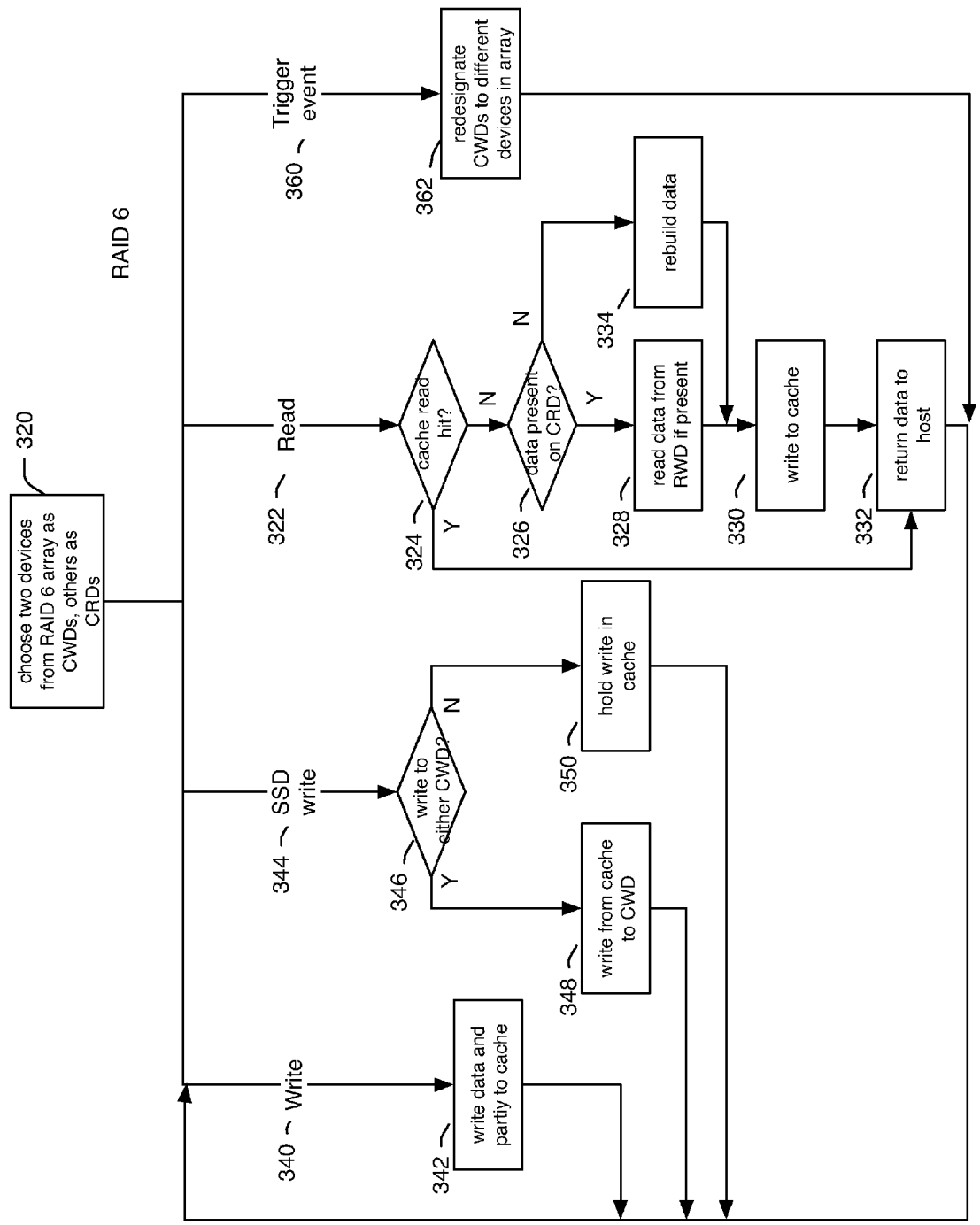
FIG. 14 is a flow diagram of the operation of the controller 304 of FIG. 13 in accordance with the invention.

When operating with one CWD, the controller 304 in the system of FIG. 13 operates as shown in the RAID 5 example of FIG. 9. In another RAID 6 embodiment, as shown in FIG. 14, the controller initially designates two solid state storage devices 308 (herein 308g, h) as a current write devices (CWDs). The other six devices are designated as current read devices (CRDs) (step 320). When the host 302 performs a read (branch 322), the data is read from the cache 306 if present (step 324). If not present, the data may be read from any of the solid state devices currently designated as read devices (CRDs) if in fact it happens to reside there (steps 326, 328). It is then written to the cache (step 330) and returned to the host (step 332).

If some or all of the data to be read is not in the cache and resides on either of the CWDs (step 326), then the data is "rebuilt" just as if it resides on a broken RAID device (step 334). Note that, since there are two CWDs, one of the other 7 devices 308 also cannot be read. But RAID 6 can rebuild data in light of two drive failures. In order to do so, reads from the six CRDs are performed and then a RAID 6 rebuild operation is performed by the controller 304 to rebuild the data. (RAID 6 rebuild schemes are vendor specific.)

In a RAID 6 array, every write actually consists of three write operations—one for data, and two for dual parity. A write that modifies a location on a storage device will therefore require 6 device I/Os to complete the required read-modify-write operation. Data and parity writes are handled exactly as in the RAID 5 embodiment. As shown in FIG. 14, when a host write is received by the controller (branch 340), the controller performs the read—modify portion if required (performing the read portion as described above, steps 322-334), and then caches both the data write and the parity writes (step 342). As writes to the solid state devices come up (branch 344), data and parity writes directed to either CWD will be posted and performed as usual (steps 346, 348). If either a data or parity write is directed to a CRD, it will be held in the cache (steps 346, 350). It should be noted that in the event of an actual disk failure, the cache holds a duplicate copy of all data writes, so fault tolerance is maintained.

Occurrence of a triggering event (branch 360) causes two solid state devices 308 to become the designated write devices, while the CWDs are re-designated CRDs (step 362). In preferred embodiments, two different solid state devices would be chosen as CWDs from the previous ones used, but in some embodiments only one CWD might be re-designated while the other stays the same. During this re-designation, all data that is destined for the device(s) being swapped from a CWD to a CRD must be held in the cache. Then the storage device designations are updated so that the previously designated CWDs become read devices (CRD) and the newly designated write device becomes the CWD. In a RAID 6+2 system, the CWDs can be rotated through each of the eight drives in accordance with the scheduling policy, or can be selectively applied to a subset of the devices, in accordance with system requirements.

Figure 15:
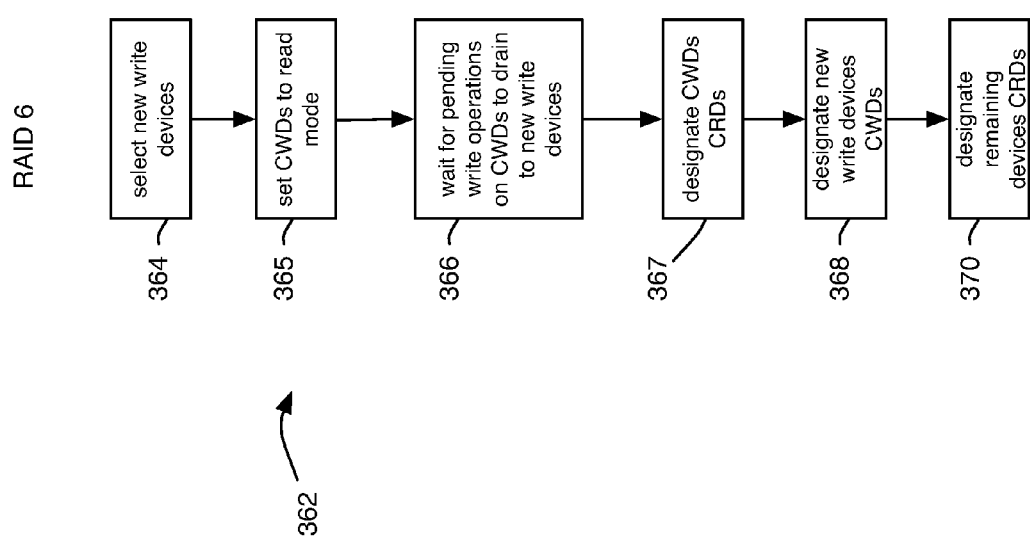
FIG. 15 is a flow diagram of the operation of the re-designation logic 362 of FIG. 14 in accordance with the invention.

The re-designation step 362 of FIG. 14 is shown in more detail in FIG. 15. In order to perform the re-designation, two devices are chosen from the RAID 6 array as new write devices (step 364). The controller then stops writing to the CWDs that are to be no longer be designated CWDs and retains all new writes in the buffer memory. The CWDs are set to read mode (step 365). Once the writes have drained from the CWDs to the new write devices, the controller designates these CWDs as CRDs (step 367), designates the devices selected as new write devices in step 364 as CWDs, and retains the designation of the remaining devices as CRDs (step 370). The writes pending for the new CWDs, as well as subsequent writes from the host, can then be written to the CWDs until the next triggering event.

During the time that the solid state devices are being re-designated, it is important that reads be allowed to complete properly. In systems providing relatively low performance, reads may remain pending until the device re-designation is complete. Reads would then resume to the newly designated CRDs. In systems where reads cannot remain pending for such long times, a third state is be entered where all solid state devices enter a read state (step 365). During this time, reads can occur to all devices until all data has been written from the cache to the new write devices and the re-designation completed. Then the new write devices are designated the CWDs and reads and writes directed to their designated devices until the next trigger event.

Figure 16:
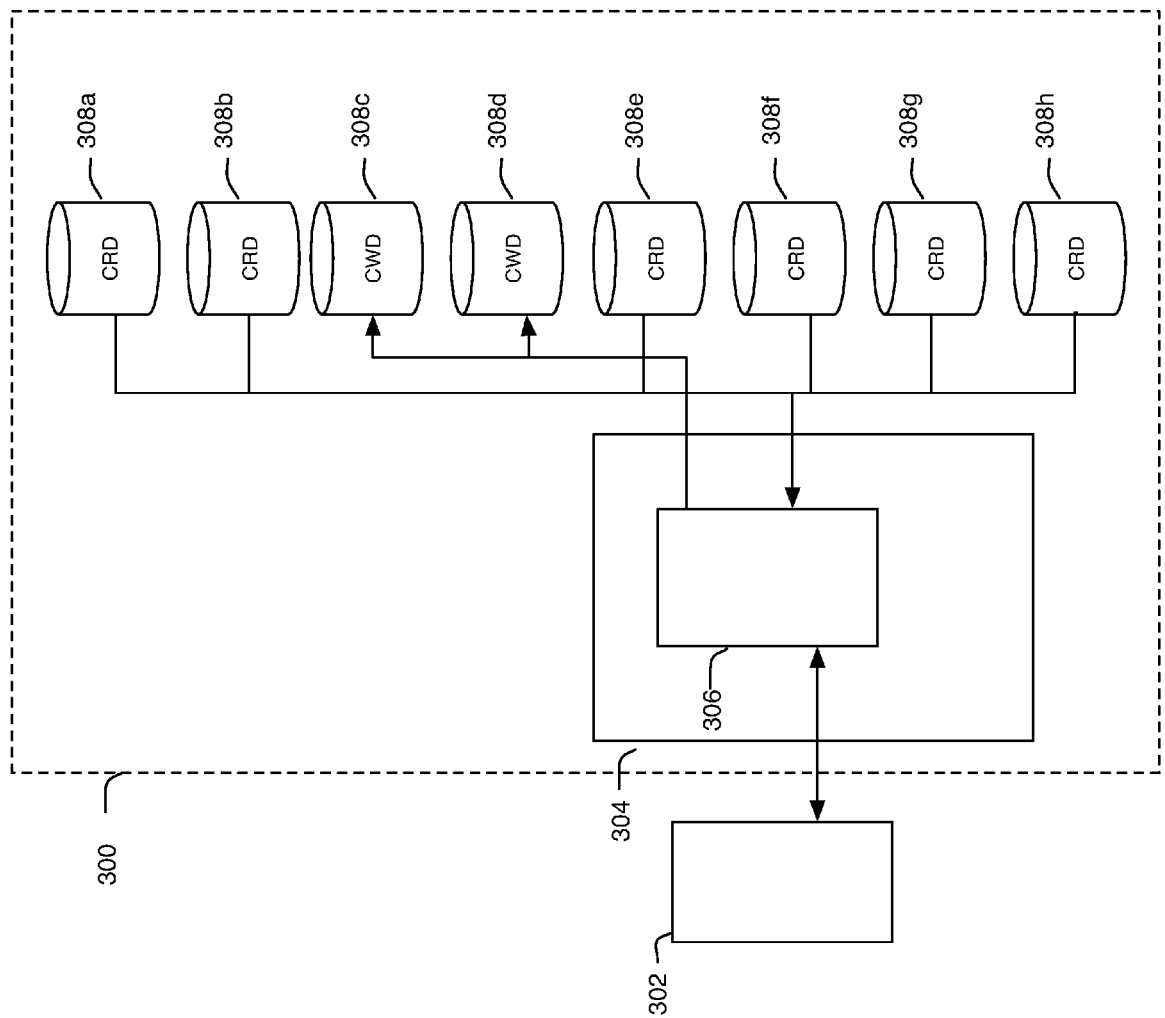
FIG. 16 is a schematic diagram of the data storage system of FIG. 13 showing the storage devices after they have been re-designated in accordance with the invention.

The triggering events that prompt device re-designation in a RAID 6 system are the same as those previously described for the mirrored array. In FIG. 16 there is shown the system of FIG. 13 after the re-designation of the two CWDs in the RAID 6 6+2 system. Whereas the original CWDs resided on solid state devices 308g and 308h, the new CWDs now reside on solid state devices 308d and 308e.

General Applicability to Data Storage Systems

In accordance with another embodiment of the invention that can be implemented in any of the previously described RAID environments, or other environments such as JBOD, additional solid state storage devices can be designated CWDs with read access (CWD+R). In this way, for example, a RAID 5 array can have two CWDs. One will have very high write performance because it performs only writes. The other will have lower performance as it performs mixed reads and writes. However, in systems wherein write activity is very high, this may be an advantageous solution. Likewise, in RAID 6, as many devices as are protected against failures can be designated CWDs and a number of further devices can be designated CWD+Rs.

Figure 17:
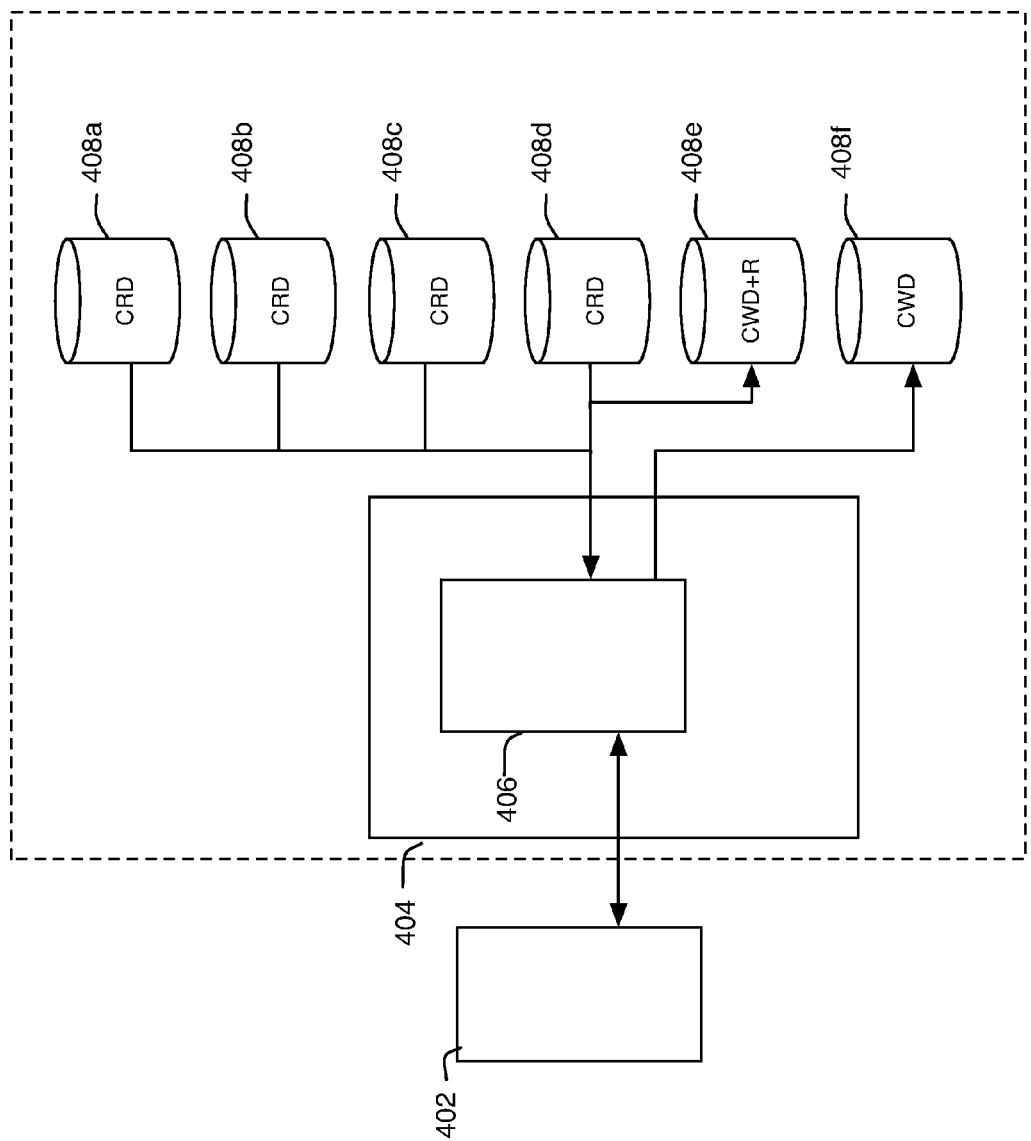
FIG. 17 is a schematic diagram of a generalized data storage system.

In FIG. 17 there is shown a data storage system 400 employing a CWD and a CWD+R in accordance with the invention. A host 402 is coupled to a controller 404 including a cache 406. Six solid state devices 408a,b,c,d,e,f are coupled to the controller 404. The solid state device 408f is shown designated as a CWD. The solid state device 408e is shown designated as a CWD+R. The solid state devices 408 in this case may be arranged as a RAID 5 or 6 redundancy group, or JBOD.

Figure 18:
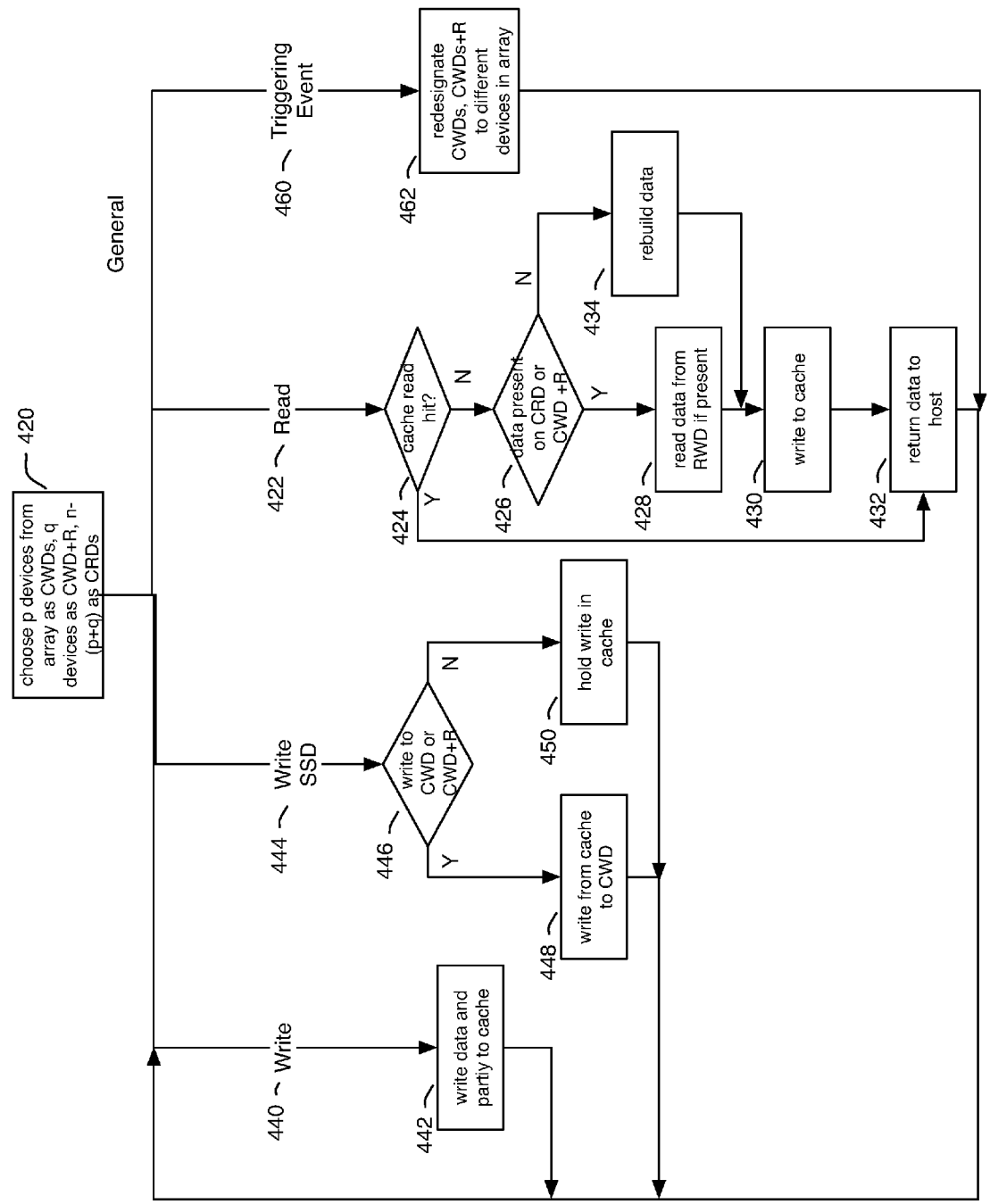
FIG. 18 is a flow diagram of the operation of the controller 404 of FIG. 13 in accordance with the invention.

In FIG. 18 there is shown the general functionality of a controller as it operates in a data storage system such as that of FIG. 17, as well as all the other earlier described data storage systems. The controller operates generally in a data storage system having n solid state storage devices wherein n is at least two. Initially (step 420), the controller designates p of the n devices as CWDs, wherein p is at least one. The controller also initially designates q of the n devices as CWD+Rs, where q is greater than or equal to 0. The remainder of the n devices are designated CRDs.

For example, in a RAID 1 system, n=2, p=1, and q=0, so there is one CWD and one CRD. In a RAID 5 3+1 system, an example embodiment could have n=4, p=1, and q=1, so in this case there would be one CWD, one CWD+R, and two CRDs. In a RAID 6 6+2 system, one example embodiment could have n=8, p=2, and q=2, so in this case there would be two CWDs, two CWD+Rs, and 4 CRDs.

When the host 402 performs a read (branch 422), the data is read from the cache 406 if present (step 424). If not present, the data may be read from any of the solid state devices currently designated as read devices (CRDs or CWD+Rs) if in fact it happens to reside there (step 426,428). It is then written to the cache (step 430) and returned to the host (step 432). In a mirror system the data will be found on the CRD. In a parity RAID system (e.g. 5 or 6), if some or all of the data to be read is not in the cache and resides on a CWD (step 426), then the data is "rebuilt" just as if it resides on a broken RAID device (step 434).

When a host write is received by the controller 404 (branch 440), the controller performs the read—modify portion if required (performing the read portion as described above, steps 422-434), and then caches both the data write and (in parity RAID systems) the parity writes (step 442). As writes to the solid state devices come up (step 444), data and parity writes directed to either CWDs or CWD+Rs will be posted and performed as usual (steps 446, 448). If either a data or parity write is directed to a CRD, it will be held in the cache (step 450).

Occurrence of a triggering event (branch 460) causes the re-designation of CWDs, CWD+Rs, and CRDs (step 462). In preferred embodiments, different solid state devices would be chosen as CWDs and CWD+Rs from the previous ones used, but in some embodiments only some CWDs and CWD+Rs might be re-designated while others stay the same. During this re-designation, all data that has been held in the cache for the newly designated write devices since the previous triggering event is written to the newly designated write devices. In a RAID 6+2 system, the CWDs and CWD+Rs can be rotated through each of the eight drives in accordance with the scheduling policy, or can be selectively applied to a subset of the devices, in accordance with system requirements.

Figure 19:
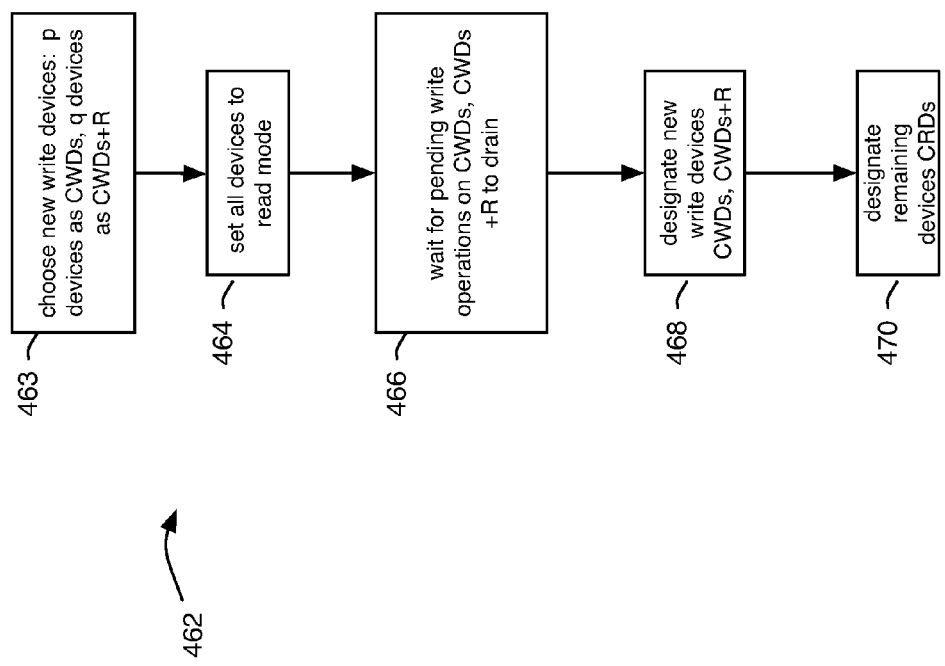
FIG. 19 is a flow diagram of the operation of the re-designation logic 462 of FIG. 14 in accordance with the invention.

In particular, referring to FIG. 19, step 462 is set forth in further detail. In order to perform the re-designation, the controller 404 chooses p new write devices that will become CWDs and q new write devices that will become CWD+Rs (step 463). (Note that the "new" write devices may not necessarily have physically changed. For example, in a RAID 6+2 group, solid state devices 408a,b might be CWDs, then after a trigger solid state devices 408b, might be CWDs.) The controller 404 then sets all devices to read mode (step 646). Once the pending write operations have all been drained from the CWDs and CWD_Rs (step 466), the controller 404 designates the new write devices as CWDs and CWD+Rs (step 468) and designates the remaining devices as CRDs (step 470).

During the time that the solid state devices are being re-designated, it is important that reads be allowed to complete properly. In systems offering low performance, reads may remain pending until the device re-designation is complete. Reads would then resume to the newly designated CRDs. In systems where reads cannot remain pending for such a long time, a third state can be entered where all solid state devices enter a read state (step 463). During this time, reads can occur to all devices until all data has been written from the cache to the new write devices and the re-designation completed. Then the new write devices are designated the CWDs and reads and writes directed to their designated devices until the next trigger event.

Figure 20:
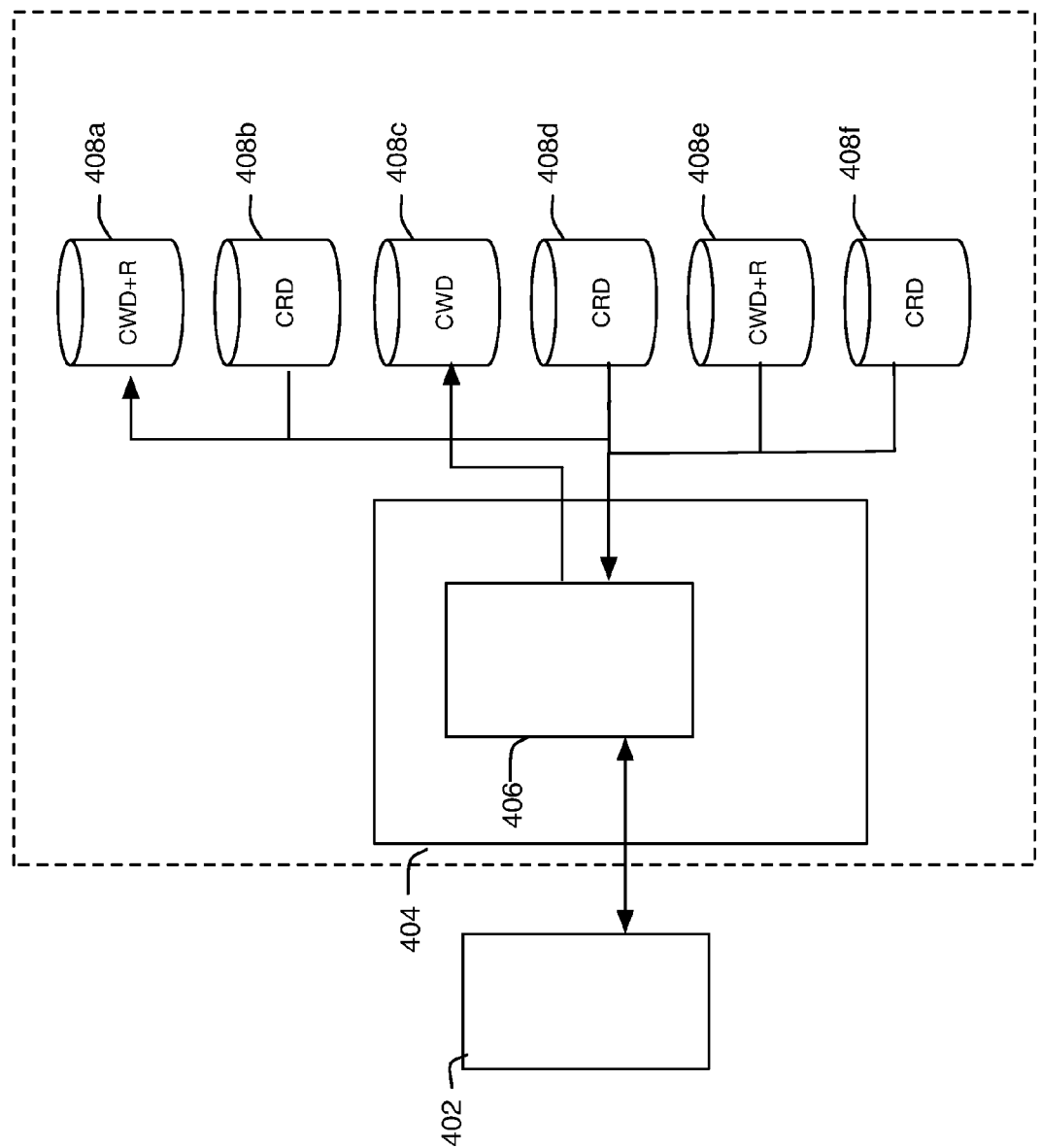
FIG. 20 is a schematic diagram of the data storage system of FIG. 17 showing the storage devices after they have been re-designated in accordance with the invention.

In FIG. 20, the system of FIG. 17 is shown after a trigger event has occurred. Whereas the solid state device 408f was originally designated a CWD, now the solid state device 408c is designated a CWD. And whereas the solid state device 408e was originally designated a CWD+R, now the solid state device 408a is designated a CWD+R.

The invention can also be employed in data storage systems employing JBOD. Although the invention has been described in terms of its advantageous use with solid state storage in data storage systems, it is understood that the mechanisms described herein can be used with all types of storage including hard disk drives, CD-ROM, CD_RW, etc. It is further noted that the invention is not restricted to data storage system implementations. The invention is applicable anywhere storage devices—e.g. flash memory, DRAM, SRAM, hard disk drives, CD_ROM, CD RW, etc.,—are used, for instance server systems and network systems.

The present invention is not to be limited in scope by the specific embodiments described herein. Indeed, various modifications of the present invention, in addition to those described herein, will be apparent to those of ordinary skill in the art from the foregoing description and accompanying drawings. For instance, though a RAID 5 3+1 array was used by example, a 7+1 array would employ the same principles of the invention. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for controlling the scheduling of data transfers between a buffer memory and a plurality of solid state storage devices in a data storage system, the apparatus comprising:
    a controller for designating at least one of the plurality of solid state storage devices as a current write device such that there is always at least one solid state storage device scheduled as a current write device;
    the controller designating the remainder of the plurality of solid state storage devices as current read device(s);
    the controller storing write data from a host in the buffer memory;
    the controller allowing storage device reads to occur only from the current read device(s);
    the controller allowing storage device writes to occur only to the current write device(s) and to any available address location of the current write device(s);
    the controller, responsive to a triggering event, updating the designations to cause a different and at least one of the plurality of solid state storage devices to be designated a new current write device, and the remainder of the plurality of solid state storage devices to be designated the current read device(s), wherein, as prerequisite to accomplishing the update of the designations, the controller allows write operations pending for each current write device to finish to that current write device and reads to occur from any of the solid state storage devices, including from each current write device.

2. The apparatus of claim 1 wherein the triggering event comprises a time period, or a number of host writes, or a number of storage device writes, or cache size, or storage device wear, or environmental conditions, or application specific requirements, or on demand from an operator, or based on policies set for logical volumes to meet availability objectives, or based on reactive or predictive algorithmic attempts to optimize performance, or any combination thereof.

3. The apparatus of claim 2 wherein the controller comprises, for each of the at least one current write device, logic for:
designating a current read device as a new current write device;
waiting for pending write operations on the at least one current write device to finish;
designating the at least one current write device as at least one new current read device;
designating the new current write device as one of the at least one current write device.

4. The apparatus of claim 1 wherein the solid state storage devices are arranged as a RAID 1, RAID 5, or RAID 6 data storage array.

5. A method of scheduling data transfers between a buffer memory and a plurality of solid state storage devices in a data storage system, the method comprising the steps of:
designating at least one of the plurality of solid state storage devices as a current write device such that there is always at least one solid state storage device scheduled as a current write device;
designating the remainder of the plurality of solid state storage devices as current read device(s);
storing write data from a host in the buffer memory;
allowing storage device reads to occur only from the current read device(s);
allowing storage device writes to occur only to the current write device(s) and to any available address location of the current write device(s);
updating the designations in response to a triggering event to cause a different at least one of the plurality of solid state storage devices to be designated a new current write device, and the remainder of the plurality of solid state storage devices to be designated a new current read device; and
allowing, as prerequisite to accomplishing the updating of the designations, write operations pending for each current write device to finish to that current write device and reads to occur from any of the solid state storage devices, including from each current write device.

6. The method of claim 5 wherein the triggering event comprises a time period, or a number of host writes, or a number of storage device writes, or cache size, or storage device wear, or environmental conditions, or application specific requirements, or on demand from an operator, or based on policies set for logical volumes to meet availability objectives, or based on reactive or predictive algorithmic attempts to optimize performance, or any combination thereof.

7. The method of claim 6 wherein the step of updating comprises, for each of the at least one current write device, the steps of:
designating a current read device as a new current write device;
waiting for the pending write operations on the at least one current write device to finish;
designating the at least one current write device as at least one new current read device;
designating the new current write device as one of the at least one current write device.

8. The method of claim 5 wherein the solid state storage devices are arranged as a RAID 1, RAID 5, or RAID 6 data storage array.

9. Apparatus for controlling the scheduling of data transfers between a buffer memory and a mirrored pair of solid state storage devices in a data storage system, the apparatus comprising:
a controller designating one of the solid state storage devices in the mirrored pair as the current write device such that there is always at least one solid state storage device scheduled as a current write device;
the controller designating the other solid state storage device in the mirrored pair as the current read device;
the controller storing write data from a host in the buffer memory;
the controller allowing storage device reads to occur only from the current read device to the buffer memory;
the controller allowing storage device writes to occur from the buffer memory only to the current write device and to any available address location of the current write device;
the controller operable upon the occurrence of a triggering event to perform a swap operation such that the current write device becomes a new current read device and the current read device becomes a new current write device, wherein, as prerequisite to accomplishing the swap operation, the controller allows write operations pending for the current write device to finish to the current write device and reads to occur from any of the solid state storage devices, including from the current write device.

10. The apparatus of claim 9 wherein the triggering event comprises a time period, or a number of host writes, or a number of storage device writes, or cache size, or storage device wear, or environmental conditions, or application specific requirements, or on demand from an operator, or based on policies set for logical volumes to meet availability objectives, or based on reactive or predictive algorithmic attempts to optimize performance, or any combination thereof.

11. The apparatus of claim 10 wherein the controller to perform a swap comprises logic for:
designating the current read device as the new current write device;
waiting for the pending write operations on the current write device to finish;
designating the current write device as the new current read device;
designating the new current write device as the current write device.

12. A method for controlling the scheduling of data transfers between a buffer memory and a mirrored pair of solid state storage devices in a data storage system, the method comprising the steps of:
designating one of the solid state storage devices in the mirrored pair as the current write device such that there is always one solid state storage device scheduled as a current write device;
designating the other solid state storage device in the mirrored pair as the current read device;
storing write data from a host in the buffer memory;
allowing storage device reads to occur only from the current read device to the buffer memory;
allowing storage device writes to occur from the buffer memory only to the current write device and to any available address location of the current write device;
performing a swap operation upon the occurrence of a triggering event such that the current write device becomes a new current read device and the current read device becomes a new current write device; and as prerequisite to accomplishing the performing of the swap operation, allowing write operations pending for the current write device to finish to the current write device and reads to occur from either of the solid state storage devices, including from the current write device.

13. The method of claim 12 wherein the triggering event comprises a time period, or a number of host writes, or a number of storage device writes, or cache size, or storage device wear, or environmental conditions, or application specific requirements, or on demand from an operator, or based on policies set for logical volumes to meet availability objectives, or based on reactive or predictive algorithmic attempts to optimize performance, or any combination thereof.

14. The method of claim 13 wherein the step to perform a swap comprises the steps of:
   designating the current read device as the new current write device;
   waiting for the pending write operations on the current write device to finish;
   designating the current write device as the new current read device;
   designating the new current write device as the current write device.

* * * * *